(12) United States Patent
Shanmugam et al.

(10) Patent No.: US 10,524,261 B2
(45) Date of Patent: Dec. 31, 2019

(54) METHOD AND SYSTEM OF RELAYING IN CELLULAR SYSTEMS

(71) Applicant: Signalchip Innovations Private Limited, Bangalore (IN)

(72) Inventors: Kandasamy Shanmugam, Bangalore (IN); Aravind Ganesan, Bangalore (IN); Himamshu Gopalakrishna Khasnis, Bangalore (IN)

(*) Notice: Subject to any disclaimer, the term of this patent is extended or adjusted under 35 U.S.C. 154(b) by 48 days.

(21) Appl. No.: 15/258,994

(22) Filed: Sep. 7, 2016

(65) Prior Publication Data

US 2017/0079040 A1  Mar. 16, 2017

(30) Foreign Application Priority Data

Sep. 11, 2015 (IN) ............................ 4848/CHE/2015

(51) Int. Cl.
| | |
|---|---|
| *H04B 7/155* | (2006.01) |
| *H04W 16/02* | (2009.01) |
| *H04W 16/16* | (2009.01) |
| *H04W 16/26* | (2009.01) |
| *H04W 28/02* | (2009.01) |
| *H04W 40/22* | (2009.01) |
| *H04W 72/04* | (2009.01) |
| *H04W 84/04* | (2009.01) |
| *H04W 92/20* | (2009.01) |

(52) U.S. Cl.
CPC .... *H04W 72/0453* (2013.01); *H04B 7/15507* (2013.01); *H04B 7/15542* (2013.01); *H04W 16/02* (2013.01); *H04W 16/16* (2013.01); *H04W 16/26* (2013.01); *H04W 28/0247* (2013.01); *H04W 40/22* (2013.01); *H04W 84/047* (2013.01); *H04W 92/20* (2013.01)

(58) Field of Classification Search
CPC ..... H04B 7/14–15514; H04B 7/15528–15557; H04B 7/18539–18543; H04B 7/18563; H04B 7/18591; H04B 17/40–1409; H04W 16/02–18; H04W 16/26; H04W 28/0247; H04W 28/06; H04W 40/22; H04W 72/0426; H04W 72/0433; H04W 72/0453; H04W 84/04–047; H04W 88/14; H04W 92/16–24

See application file for complete search history.

(56) References Cited

U.S. PATENT DOCUMENTS

| | | | | |
|---|---|---|---|---|
| 6,088,592 | A  * | 7/2000 | Doner | H04B 7/2606 |
| | | | | 455/11.1 |
| 2009/0080366 | A1 * | 3/2009 | Shao | H04B 7/15542 |
| | | | | 370/315 |
| 2011/0158156 | A1 * | 6/2011 | Ma | H04B 7/15542 |
| | | | | 370/315 |

* cited by examiner

*Primary Examiner* — Timothy J Weidner

(57) ABSTRACT

A single-hop relay cellular system 300 and a multi-hop relay cellular system 400 including frequency links (102A-F), a backhaul link 104, an access link 106, and a relay base station 108 are provided. The relay base station 108 is configured to interchange a frequency of operation between a first frequency carrier 114A and a second frequency carrier 114B for uplink and downlink transmission. Each node in the single-hop relay cellular system 300 and the multi-hop relay cellular system 400 is enabled to transmit and receive on frequency carriers through static or dynamic control.

9 Claims, 6 Drawing Sheets

METHOD AND SYSTEM OF RELAYING IN CELLULAR SYSTEMS

CROSS-REFERENCE TO RELATED APPLICATIONS

This application claims priority to Indian Patent Application number 4848/CHE/2015 filed on Sep. 11, 2015, the complete disclosure of which, in its entirely entirety, is herein incorporated by reference.

BACKGROUND

Technical Field

The embodiments herein generally relate to cellular networks, and more particularly, to systems and methods for improving the coverage and capacity of cellular networks using relay nodes.

Description of the Related Art

Pursuant to an exemplary scenario, coverage of cellular systems may be improved by using relay nodes that can augment capacity or coverage of a cellular network. A typical cellular ecosystem consists of one or more base stations transmitting data on a downlink resource and receiving data on an uplink resource and a user equipment receiving on the downlink resource and transmitting on the uplink resource. The uplink and downlink resources may be operating at two different frequency allocations in the case of a Frequency Division Duplexing and at two different time intervals in the case of a Time Division Duplexing. Typically relaying may be performed through an out-band relaying or an in-band replaying. In out-band relaying, relaying may be performed using two different pairs of resources that are orthogonal to one another. In in-band relaying, relaying may be performed using one pair of resources. Typically, the in-band relaying does not require additional spectral resources to be acquired and is of considerable interest.

FIG. 1 depicts a conventional one hop-relay system 100 including a set of four links (102A-102D) active on the one hop-relay system 100 on frequency bands F1 and F2. As depicted in FIG. 1, the one hop relay system 100 also includes a macro base-station to relay base-station (108) link referred to as the backhaul link 104 consisting of the first link 102A and the second link 102B and a relay base-station 108 to user equipment/base station (112) link referred to as an access link 106 consisting of the third link 102C and the fourth link 102D. The relay base station 108 appears as a user equipment (UE) on the back-haul network and as a base-station on the access network. The relay base station 108 has to simultaneously decode and transmit on both its Uplink and Downlink links (links 1+3 (102A and 102C) and links 2+4 (102B and 102D) respectively).

FIG. 2 depicts a conventional multi hop-relay system 200 including a set of six links (102A-102F) active on the multi hop-relay system 200 on frequency bands F1 and F2, a plurality of downlink transmitters, a plurality or downlink receivers, a plurality of uplink transmitters, and a plurality or uplink receivers. The plurality of downlink transmitters includes a first downlink transmitter 224, a second downlink transmitter 228, and a third downlink transmitter 232. The plurality of downlink receivers includes a first downlink receiver 226, a second downlink receiver 230, and a third downlink receiver 234. The plurality of uplink transmitters includes a first uplink transmitter 214, a second uplink transmitter 218, and a third uplink transmitter 222. The plurality of uplink receivers includes a first uplink receiver 210, a second uplink receiver 216, and a third uplink receiver 220.

The first link 102A is carried on the first frequency carrier 114A from the first uplink transmitter 214 to the first uplink receiver 210. The second link 102B is carried on the second frequency carrier 114B from the first downlink transmitter 224 to the first downlink receiver 226. The third link 102C is carried on the first frequency carrier 114A from the second uplink transmitter 218 to the second uplink receiver 216. The fourth link 102D is carried on the second frequency carrier 114B from the second downlink transmitter 228 to the second downlink receiver 230. The fifth link 102E is carried on the first frequency carrier 114A from the third uplink transmitter 222 to the third uplink receiver 220. The sixth link 102F is carried on the second frequency carrier 114B from the third downlink transmitter 232 to the third downlink receiver 234.

As depicted in FIG. 1 and FIG. 2, the transmission and reception operations for uplink are performed on frequency carrier F1 and the transmission and reception operations for downlink are performed on frequency carrier F2, accordingly the transmission and reception on uplink/downlink are performed on same frequency band or. This requires careful and complex design of one or more features like signal processing chains or antenna isolation to reduce the effect of the relay transmission on its receive as the transmission and reception frequencies on both the links (3 & 4) (102C and 102D) are the same and the transmission power is typically much higher than the reception power for optimum power usage. Due to the above stated reasons the conventional mode of relaying described above results in high cost and less efficiency.

SUMMARY

This summary is provided to introduce a selection of concepts in a simplified form that are further described below in the Detailed Description. This summary is not intended to identify key or essential features of the claimed subject matter, nor is to be intended to be used as an aid in determining the scope of the claimed subject matter.

In one aspect, a single-hop relay cellular system, includes a plurality of uplink receivers that includes at least a first uplink receiver and a second uplink receiver, a plurality of uplink transmitters that include at least a first uplink transmitter and a second uplink transmitter, wherein a first link is carried on a first frequency carrier from the first uplink transmitter to the first uplink receiver. A third link is carried on a second frequency carrier from the second uplink transmitter to the second uplink receiver, a plurality of downlink receivers that includes a first downlink receiver and a second downlink receiver, a plurality of downlink transmitters that includes a first downlink transmitter and a second downlink transmitter. A second link is carried on the second frequency carrier from the first downlink transmitter to the first downlink receiver. A fourth link is carried on the first frequency carrier from the second downlink transmitter to the second downlink receiver, a relay base station, which is configured to interchange a frequency of operation between the first frequency carrier and the second frequency carrier for uplink transmission and downlink transmission. The first frequency carrier enables a frequency division mode of operation of the cellular system for uplink operation of the single-hop cellular system, and the second frequency carrier enables the frequency division mode of operation of the single-hop cellular system for downlink operation, and an access base station, which is coupled to a user equipment base station through the relay base station.

In another aspect, a multi-hop relay cellular system, includes a plurality of uplink receivers that includes at least a first uplink receiver, a second uplink receiver, and a third uplink receiver, a plurality of uplink transmitters that include at least a first uplink transmitter, a second uplink transmitter, and a third uplink transmitter, a plurality of downlink receivers that includes at least a first downlink receiver, a second downlink receiver, and a third downlink receiver, a plurality of downlink transmitters that include at least a first downlink transmitter, a second downlink transmitter, and a third downlink transmitter. A first link is carried on a first frequency carrier from the first uplink transmitter to the first uplink receiver, a second link is carried on a second frequency carrier from the first downlink transmitter to the first downlink receiver, a fourth link is carried on the first frequency carrier from the second downlink transmitter to the second downlink receiver, a third link is carried on the second frequency carrier from the second uplink transmitter to the second uplink receiver, a fifth link is carried on the first frequency carrier from the third uplink transmitter to the third uplink receiver, a sixth link is carried on the second frequency carrier from the third downlink transmitter to the third downlink receiver, and a first relay base station and a second relay base station, the first relay base station and the second relay base station are configured to interchange a frequency of operation between the first frequency carrier and the second frequency carrier for uplink transmission and downlink transmission.

In yet another aspect, a method for relaying in a single-hop or multi-hop relay cellular system by interchanging frequency of operation between backhaul link and access link. The method includes following steps of (a) performing a reception operation in said uplink on the first frequency carrier from the first relay base station to an access base station through a first link, while simultaneously performing, a transmission operation in the downlink on the second frequency carrier from an access base station to the first relay base station through a second link; and (b) performing a reception operation in an uplink on a second frequency carrier from a user equipment (UE) or a second relay base station to a first relay base station through a third link, while simultaneously performing a transmission operation in a downlink on the first frequency carrier from a first relay base station to a user equipment (UE) or a second relay base station through a fourth link.

Embodiments of the present disclosure substantially eliminate or at least partially address the aforementioned problems in the prior art, and provide a mechanism for performing transmission and reception operations on different frequency carriers.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated using identical numbers.

Embodiments of the present disclosure will now be described, by way of example only, with reference to the following diagrams wherein.

Figure 1:
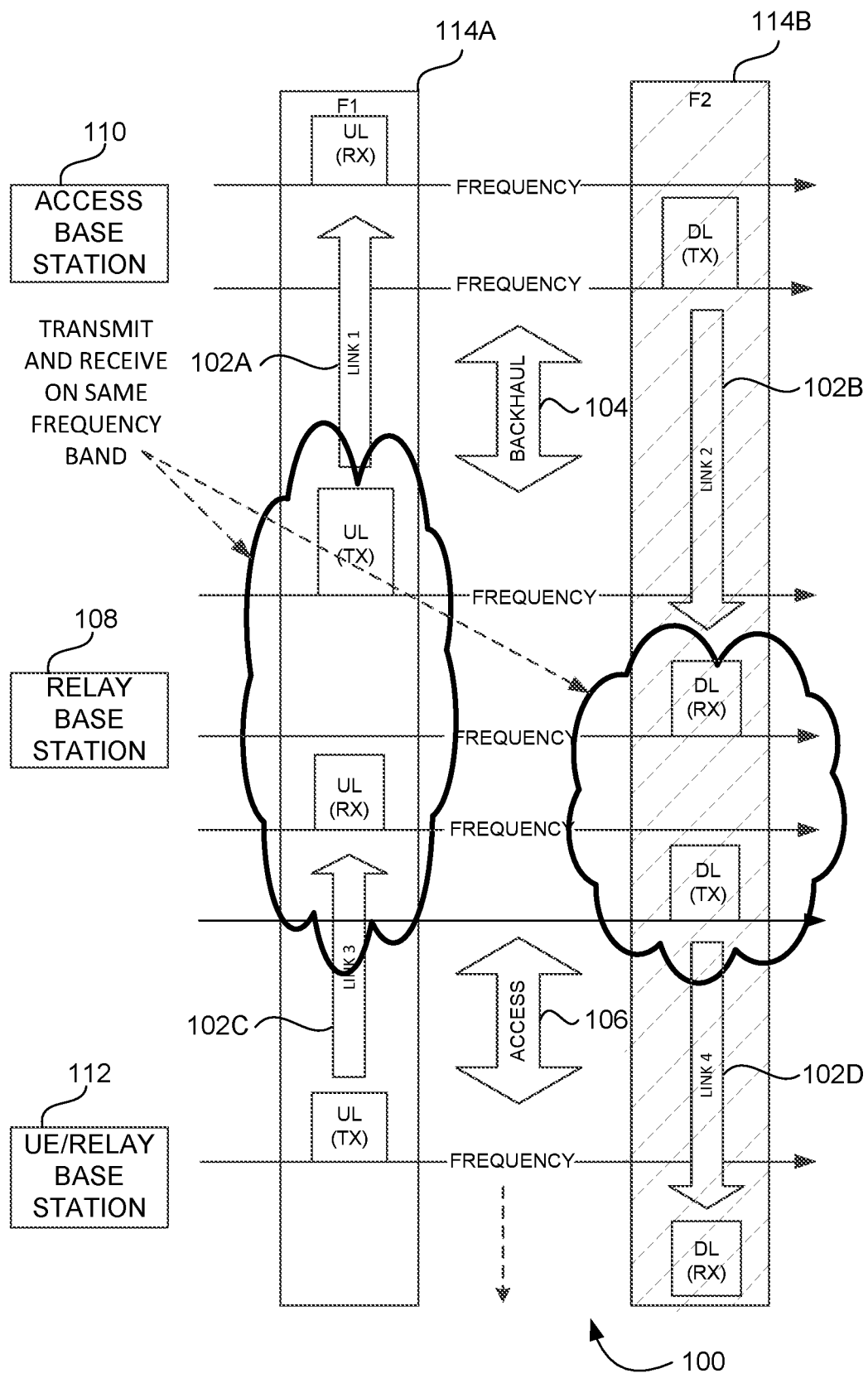
FIG. 1 illustrates a conventional one hop-relay system according to an embodiment herein.
Figure 2:
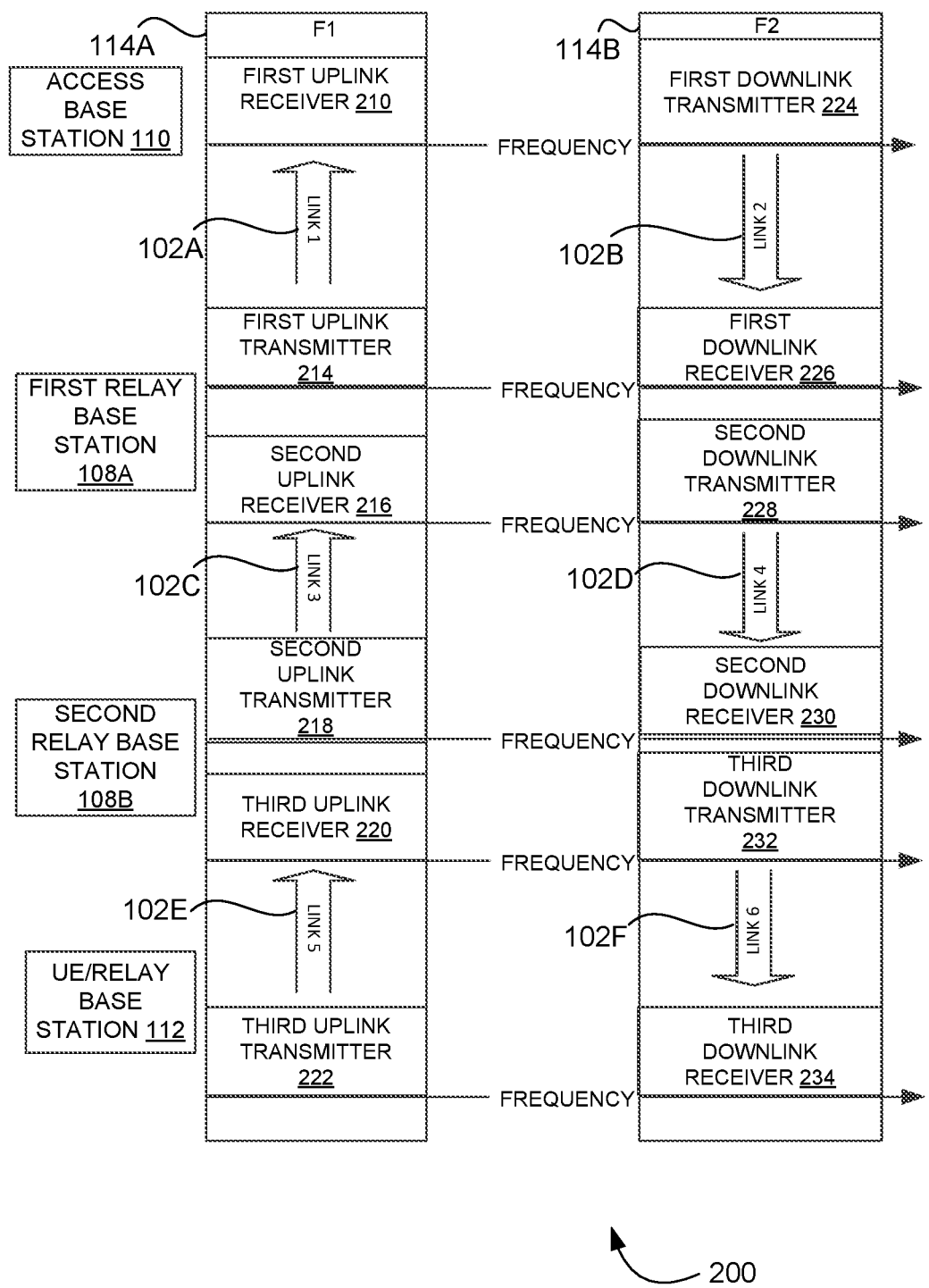
FIG. 2 illustrates a conventional multi hop-relay system according to an embodiment herein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is point

DETAILED DESCRIPTION OF EMBODIMENTS

The following detailed description illustrates embodiments of the present disclosure and ways in which they may be implemented. Although some modes of carrying out the present disclosure have been disclosed, those skilled in the art would recognize that other embodiments for carrying out or practicing the present disclosure are also possible.

In one aspect, a single-hop relay cellular system, includes a plurality of uplink receivers that includes at least a first uplink receiver and a second uplink receiver, a plurality of uplink transmitters that include at least a first uplink transmitter and a second uplink transmitter, wherein a first link is carried on a first frequency carrier from the first uplink transmitter to the first uplink receiver. A third link is carried on a second frequency carrier from the second uplink transmitter to the second uplink receiver, a plurality of downlink receivers that includes a first downlink receiver and a second downlink receiver, a plurality of downlink transmitters that includes a first downlink transmitter and a second downlink transmitter. A second link is carried on the second frequency carrier from the first downlink transmitter to the first downlink receiver. A fourth link is carried on the first frequency carrier from the second downlink transmitter to the second downlink receiver, a relay base station, which is configured to interchange a frequency of operation between the first frequency carrier and the second frequency carrier for uplink transmission and downlink transmission. The first frequency carrier enables a frequency division mode of operation of the cellular system for uplink operation of the single-hop cellular system, and the second frequency carrier enables the frequency division mode of operation of the single-hop cellular system for downlink operation, and an access base station, which is coupled to a user equipment base station through the relay base station.

In an embodiment, the single-hop relay cellular system as claimed in claim 1, the relay base station performs a reception of the second link and the reception of the third link on the second frequency carrier, and performs a transmission of the first link and the transmission of the fourth link on the first frequency carrier.

In another embodiment, the single-hop relay cellular system as claimed in claim 1, the relay base station performs the transmission of the first link and the transmission of the fourth link on the second frequency carrier, and performs the reception of the second link and the reception of a third link on the first frequency carrier.

In yet another embodiment, the single-hop relay cellular system as claimed in claim 1, allocating the first frequency carrier and the second frequency carrier is selected from at least one of (i) no overlap implementation of the first frequency carrier and the second frequency carrier, or (ii) partial overlap implementation of the first frequency carrier and the second frequency carrier, or (iii) complete overlap of the first frequency carrier and the second frequency carrier.

In another aspect, a multi-hop relay cellular system, includes a plurality of uplink receivers that includes at least a first uplink receiver, a second uplink receiver, and a third uplink receiver, a plurality of uplink transmitters that include at least a first uplink transmitter, a second uplink transmitter, and a third uplink transmitter, a plurality of downlink receivers that includes at least a first downlink receiver, a second downlink receiver, and a third downlink receiver, a plurality of downlink transmitters that include at least a first downlink transmitter, a second downlink transmitter, and a third downlink transmitter. A first link is carried on a first frequency carrier from the first uplink transmitter to the first uplink receiver, a second link is carried on a second frequency carrier from the first downlink transmitter to the first downlink receiver, a fourth link is carried on the first frequency carrier from the second downlink transmitter to the second downlink receiver, a third link is carried on the second frequency carrier from the second uplink transmitter to the second uplink receiver, a fifth link is carried on the first frequency carrier from the third uplink transmitter to the third uplink receiver, a sixth link is carried on the second frequency carrier from the third downlink transmitter to the third downlink receiver, and a first relay base station and a second relay base station, the first relay base station and the second relay base station are configured to interchange a frequency of operation between the first frequency carrier and the second frequency carrier for uplink transmission and downlink transmission.

In an embodiment, the multi-hop relay cellular system as claimed in claim 5, the first relay base station performs a reception of the second link and a reception of the third link on the second frequency carrier, and performs a transmission of the first link and a transmission of the fourth link on the first frequency carrier.

In another embodiment, the multi-hop relay cellular system as claimed in claim 5, the relay base station performs the transmission of the first link and the transmission of the fourth link on the second frequency carrier, and performs the reception of the second link and the reception of a third link on the first frequency carrier.

In yet another embodiment, multi-hop relay cellular system as claimed in claim 5, allocating the first frequency carrier and the second frequency carrier is selected from at least one of (i) no overlap implementation of the first frequency carrier and the second frequency carrier, or (ii) partial overlap implementation of the first frequency carrier and the second frequency carrier, or (iii) complete overlap of the first frequency carrier and said second frequency carrier.

In yet another aspect, a method for relaying in a single-hop or multi-hop relay cellular system by interchanging frequency of operation between backhaul link and access link. The method includes following steps of (a) performing a reception operation in said uplink on the first frequency carrier from the first relay base station to an access base station through a first link, while simultaneously performing, a transmission operation in the downlink on the second frequency carrier from an access base station to the first relay base station through a second link; and (b) performing a reception operation in an uplink on a second frequency carrier from a user equipment (UE) or a second relay base station to a first relay base station through a third link, while simultaneously performing a transmission operation in a downlink on the first frequency carrier from a first relay base station to a user equipment (UE) or a second relay base station through a fourth link.

DETAILED DESCRIPTION OF THE DRAWINGS

Figure 3:
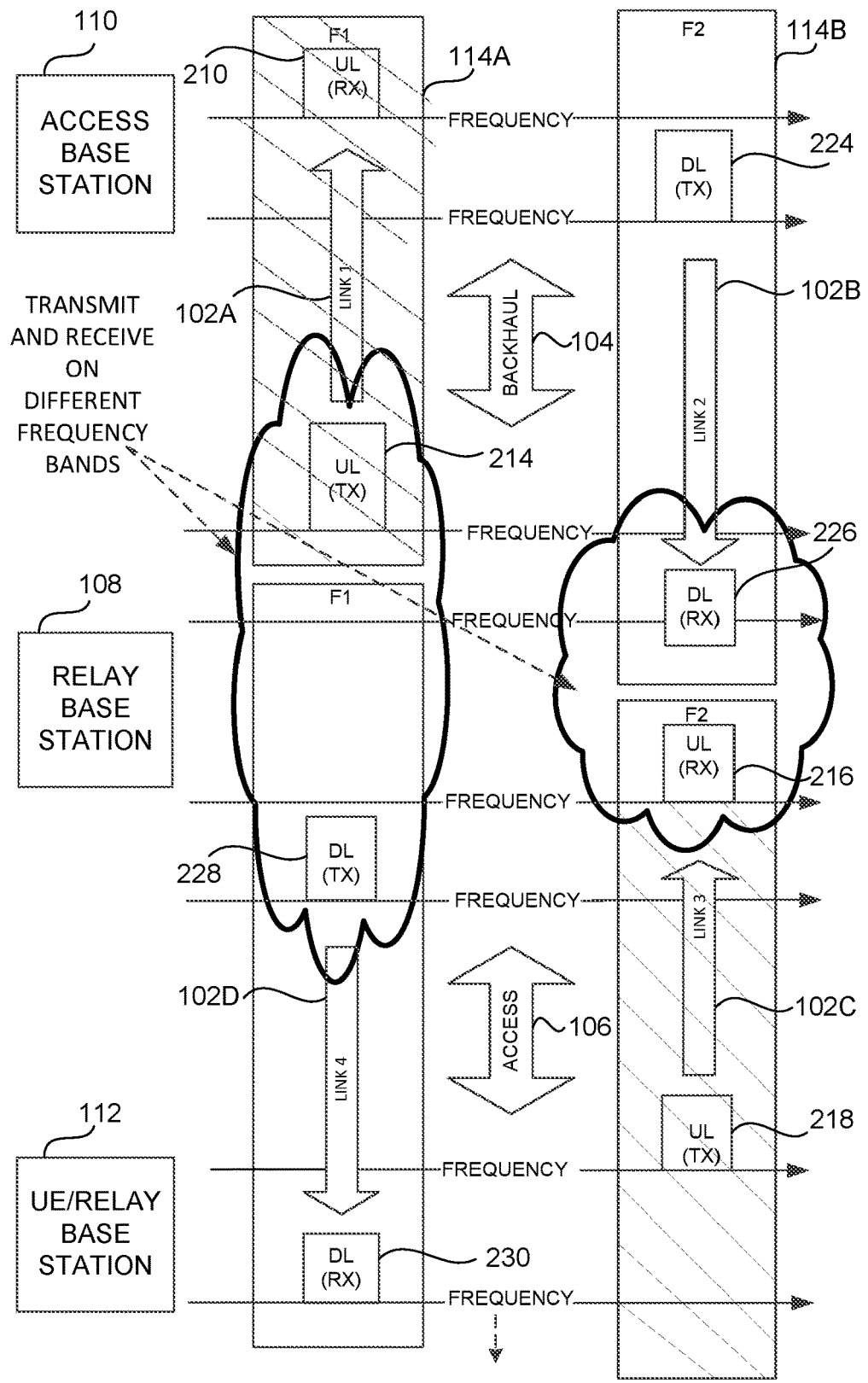
FIG. 3 illustrates a single hop-relay system according to an embodiment herein.

FIG. 3 illustrates a one hop-relay system 300 according to an embodiment herein. The one-hop relay system 300 includes a first link 102A, a second link 102B, a third link 102C, a fourth link 102D, a backhaul link 104 consisting of the first link 102A and the second link 102B, an access link 106 consisting of the third link 102C and the fourth link 102D, a relay base station 108, a base station 110, a user equipment/relay base station 112, a first frequency carrier 114A, a second frequency carrier 114B, a first uplink receiver 210, a first uplink transmitter 214, a first downlink transmitter 224, a first downlink receiver 226, a second downlink transmitter 228, a second downlink receiver 230, a second uplink receiver 216, and a second uplink transmitter 218.

In one embodiment, the first link 102A is carried on the first frequency carrier 114A from the first uplink transmitter 214 to the first uplink receiver 210. The second link 102B is carried on the second frequency carrier 114B from the first downlink transmitter 224 to the first downlink receiver 226. The third link 102C is carried on the second frequency carrier 114B from the second uplink transmitter 218 to the second uplink receiver 216. The fourth link 102D is carried on the first frequency carrier 114A from the second downlink transmitter 228 to the second downlink receiver 230.

The first and the second frequency carriers 114A and 114B enable frequency division duplexing mode of operation of the cellular system 200. The link between the base station 110 and the relay base station 108 is called as the backhaul link 104 and the link between the relay base station 108 and the UE/relay base station 112 is called as the access link 106. The base station 110 establishes a connection to the user equipment/relay base station 112 through the relay base station 108. The relay base station 108 is configured to switch the frequency of operation between the first frequency carrier 114A (F1) and the second frequency carrier 114B (F2) for downlink/uplink operation based on the configuration. The downlink and the uplink transmissions and reception are performed by the relay base station 108 by flipping the frequencies, such that the transmission and reception operations for each of uplink and downlink are performed on frequency carriers F1 and F2 different from the backhaul configuration.

In one embodiment, the relay base station 108 performs reception of both the second link 102B and the third link 102C on the second frequency carrier 114B and performs transmission of both the first link 102A and the fourth link 102D on the first frequency carrier 114A. This enables maintaining all transmissions of the relay base station 108 on the first frequency carrier 114A while performing all receptions of the relay base station 108 on the second frequency carrier 114B.

In another embodiment, the relay base station 108 performs reception of both the second link 102B and the third link 102C on the first frequency carrier 114A, and performs transmission of both the first link 102A and the fourth link 102D on the second frequency carrier 114B.

Accordingly, the problem of transmit signal affecting the receive signal is avoided in the cellular system 300 as transmission and the reception are performed on different frequency carriers. Each node in the cellular system 300 is enabled to transmit and receive on frequency carriers through static or dynamic control.

Figure 4:
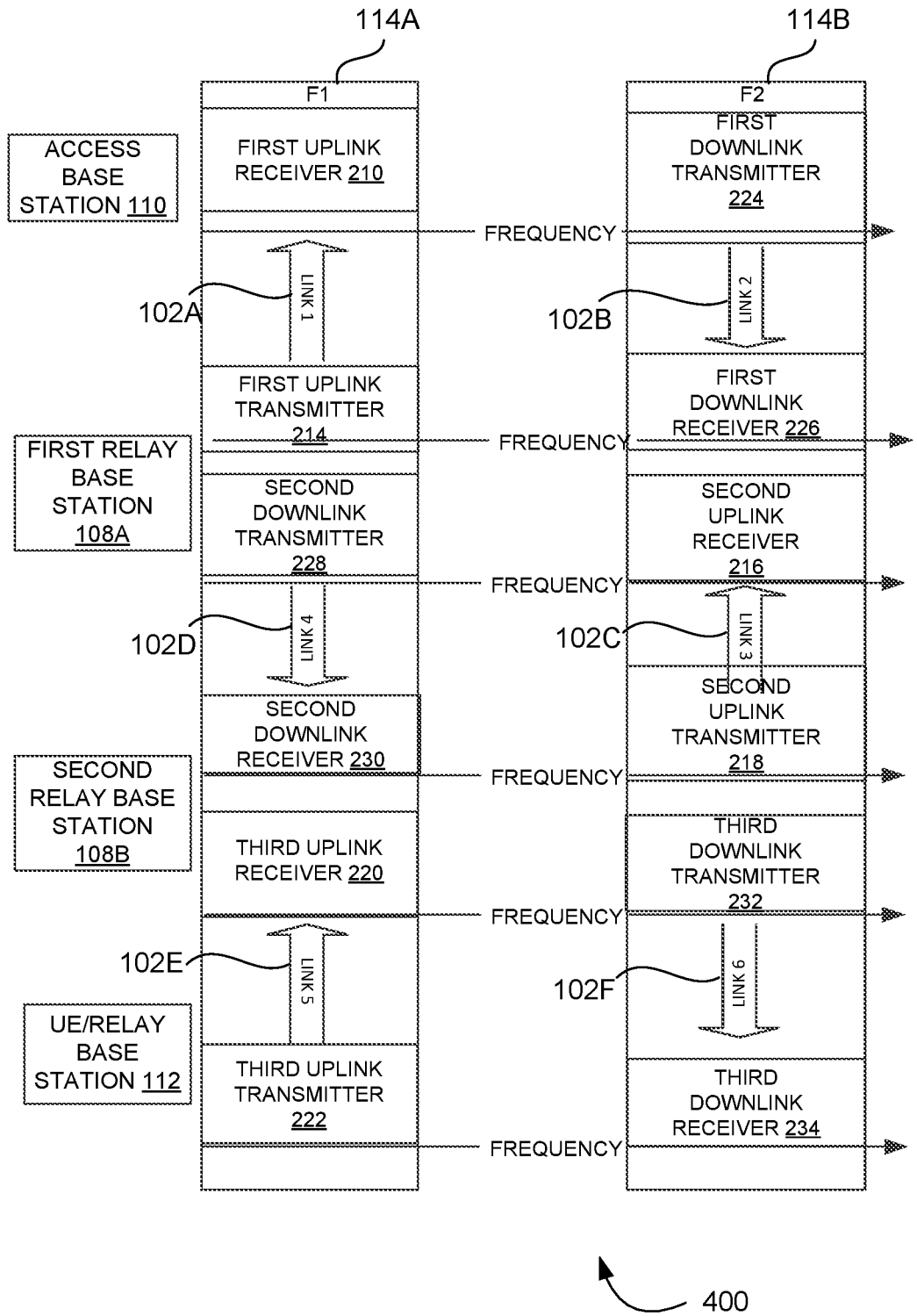
FIG. 4 illustrates a multi hop-relay system according to an embodiment herein.

FIG. 4 illustrates a multi-hop relay system 400 according to an embodiment herein. In one embodiment, the first link 102A is carried on the first frequency carrier 114A from the first uplink transmitter 214 to the first uplink receiver 210. The second link 102B is carried on the second frequency carrier 114B from the first downlink transmitter 224 to the first downlink receiver 226. The third link 102C is carried on the second frequency carrier 114B from the second uplink transmitter 218 to the second uplink receiver 216. The fourth link 102D is carried on the first frequency carrier 114A from the second downlink transmitter 228 to the second downlink receiver 230. The fifth link 102E is carried on the first frequency carrier 114A from the third uplink transmitter 222 to the third uplink receiver 220. The sixth link 102F is carried on the second frequency carrier 114B from the third downlink transmitter 232 to the third downlink receiver 234.

The multi-hop relay system 400 also includes a first relay base station 108A and a second relay base station 108B. The first relay base station 108A and the second relay base station 108B are configured to interchange the frequency of operation between the first frequency carrier 114A and the second frequency carrier 114B for uplink transmission and downlink transmission. In one embodiment, relaying in the multi-hop system 400 is configured by toggling the first frequency carrier 114A and the second frequency carrier 114B at each alternate relay in the starting with the first relay base station 108A. For example, a system having 'n' number of hops, toggling is performed at relays 1, 3, 5 and so on up till the $n^{th}$ relay.

The four links (102A-D) at the relay base station 108 may be realized using three frequencies. Two transmit or two receive links are operated on one frequency and the remaining links are operated on the remaining two frequencies. In one embodiment, the relay base station performs a reception of the second link 102B and a reception of the third link 102C on one frequency carrier, and performs a transmission of the first link 102A on the second frequency carrier 114B and transmission of a fourth link on a third frequency carrier. In another embodiment, the relay base station 108 performs transmission of the first link 102A and transmission of the fourth link 102D on one frequency carrier, and performs reception of the second link 102B on the second frequency carrier 114A and reception of a third link on the third frequency carrier.

Figure 5:
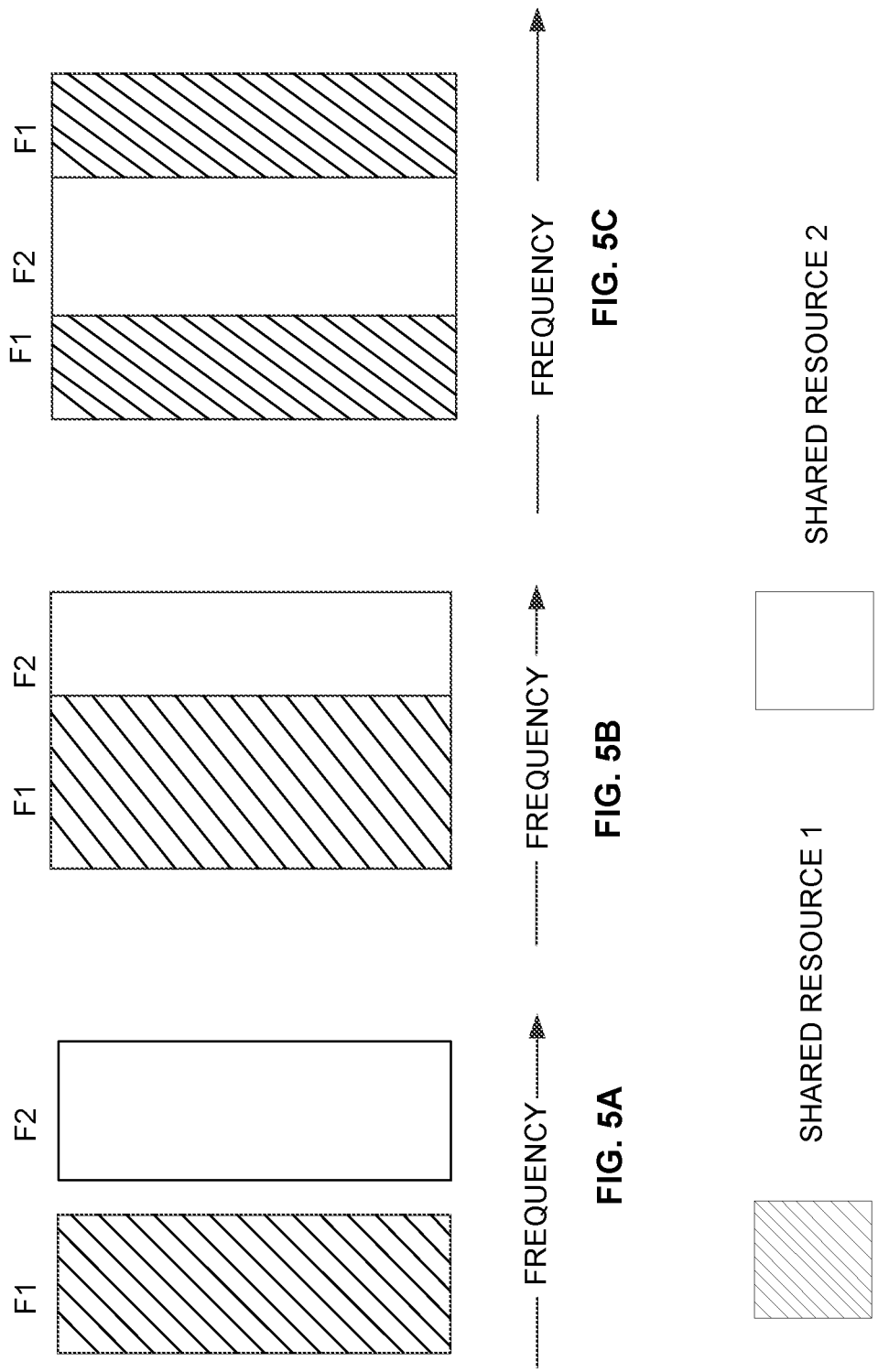
FIGS. 5A-5C illustrate various ways of allocating frequency carriers in the single-hop relay cellular system of FIG. 3 and the multi-hop relay cellular system of FIG. 4 according to an embodiment herein.

FIGS. 5A-5C illustrate various ways of allocating frequency carriers in the single-hop relay cellular system 300 of FIG. 3 and the multi-hop cellular relay system 400 of FIG. 4 according to an embodiment herein. More particularly, FIG. 5A illustrates frequency carrier shared between the first link 102A and the third link 102C or between the second link 102B and the fourth link 102D with no overlap in which the cellular system 200 may be implemented. Similarly, FIG. 5B illustrates frequency carrier shared between the first link 102A and the third link 102C or between the second link 102B and the fourth link 102D with partial overlap in which the cellular system 200 may be implemented. FIG. 5C illustrates frequency carrier shared between the first link 102A and the third link 102C or between the second link 102B and the fourth link 102D with complete overlap in which the cellular system 200 may be implemented. However the specific frequency resource allocated for the backhaul and access links have be non-overlapping at any given time in all the above.

Figure 6:
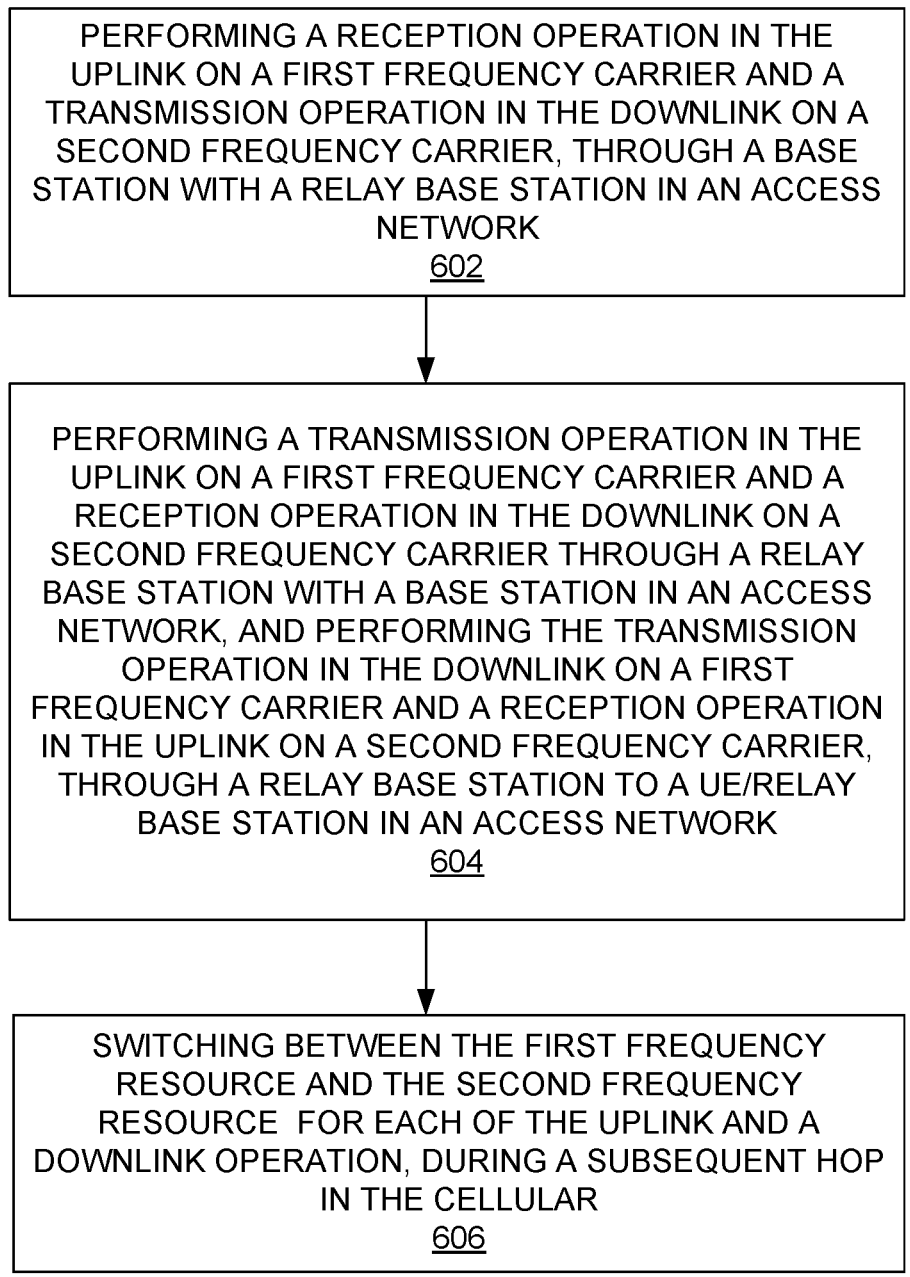
FIG. 6 is a flow diagram illustrating a method of relaying in the single-hop relay cellular system by interchanging the frequency of operation between the backhaul link and the access link of FIG. 3 according to an embodiment herein.

FIG. 6 is a flow diagram 600 illustrating a method of relaying in the single-hop relay cellular system 300 by interchanging the frequency of operation between the backhaul link 104 and the access link 106 of FIG. 3 according to an embodiment herein. At step 602, a reception operation is performed in the uplink on a first frequency carrier (F1 114A) and a transmission operation in the downlink is performed on a second frequency carrier (F2 114B), by a base station 112 to a relay base station 108 in an access network 106. At step 604, a transmission operation is performed in the uplink on a first frequency carrier and a reception operation is performed in the downlink on a second frequency carrier through a relay base station with a base station in an access network. Additionally transmission operation is performed in the downlink on a first frequency carrier and a reception operation in the uplink on a second frequency carrier, through a relay base station to a UE/relay base station in an access network.

At step 606, the process involves switching between the first frequency carrier 114A and the second frequency carrier (114B) for each of an uplink and a downlink operation. This enables maintaining different transmission and reception frequencies on uplink and downlink. Accordingly, the problem of transmit signal affecting the receive signal is avoided in the single-hop relay cellular system 300 and the multi-hop relay cellular system 400 as transmissions on either side of the hop is done on a single frequency carrier and receptions are performed using another single frequency carriers. Each node in the single-hop relay cellular system 300 is enabled to transmit and receive on frequency carriers through static or dynamic control.

The single-hop relay cellular system 300 and multi-hop relay cellular system 400 is enclosed. All transmissions of the relay base station 108 are maintained on one frequency carrier while performing all receptions of the relay base station on another frequency carrier. Accordingly, the problem of transmit signal affecting the receive signal is avoided as transmission and the reception are performed on different frequency carriers.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A single-hop relay cellular system to perform transmission and reception using only two frequency carriers for an optimal Radio Frequency (RF) circuit design, comprising;
   a plurality of uplink receivers that comprises at least a first uplink receiver and a second uplink receiver;
   a plurality of uplink transmitters that comprises at least a first uplink transmitter and a second uplink transmitter;
   wherein a first link is carried on a first frequency carrier from said first uplink transmitter to said first uplink receiver, wherein a third link is carried on a second frequency carrier from said second uplink transmitter to said second uplink receiver;
   a plurality of downlink receivers that comprises a first downlink receiver and a second downlink receiver;
   a plurality of downlink transmitters that comprises a first downlink transmitter and a second downlink transmitter;
   wherein a second link is carried on said second frequency carrier from said first downlink transmitter to said first downlink receiver, wherein a fourth link is carried on said first frequency carrier from said second downlink transmitter to said second downlink receiver;
   an access base station, which is coupled to a user equipment base station through a relay base station, wherein transmissions of the access base station are performed on the first frequency carrier and receptions of the access base station are performed on the second frequency carrier; and
   said relay base station, which is configured to interchange a frequency of operation between said first frequency carrier and said second frequency carrier for uplink transmission and downlink transmission,
   wherein a transmission of said relay base station to said access base station and said user equipment base station is performed on the first frequency carrier simultaneously, wherein said transmission of said relay base station comprises (i) a first transmission that is performed from said relay base station to said access base station and (ii) a second transmission that is performed from said relay base station to said user equipment base station,
   wherein a reception of said relay base station from said access base station and said user equipment base station is performed on the second frequency carrier simultaneously, wherein said reception of said relay base station comprises (i) a first reception that is performed on said relay base station from said access base station and (ii) a second reception that is performed on said relay base station from said user equipment base station,
   wherein said single-hop relay cellular system performs the transmission and the reception of said relay base station simultaneously using said first frequency and said second frequency respectively for said optimal Radio Frequency (RF) circuit design of the single-hop relay cellular system.

2. The single-hop relay cellular system as claimed in claim 1, wherein said relay base station performs a reception of said second link and said reception of said third link on said second frequency carrier, and performs a transmission of said first link and transmission of said fourth link on said first frequency carrier.

3. The single-hop relay cellular system as claimed in claim 1, wherein said relay base station performs said transmission of said first link and said transmission of said fourth link on said second frequency carrier, and performs said reception of said second link and said reception of a third link on said first frequency carrier.

4. The single-hop relay cellular system as claimed in claim 1, wherein allocating said first frequency carrier and said second frequency carrier is selected from at least one of (i) no overlap implementation of said first frequency carrier and said second frequency carrier, or (ii) partial overlap implementation of said first frequency carrier and said second frequency carrier, or (iii) complete overlap of said first frequency carrier and said second frequency carrier.

5. A multi-hop relay cellular system to perform transmission and reception using only two frequency carriers for an optimal Radio Frequency (RF) circuit design, comprising
   a plurality of uplink receivers that comprises at least a first uplink receiver, a second uplink receiver, and a third uplink receiver;
   a plurality of uplink transmitters that comprises at least a first uplink transmitter, a second uplink transmitter, and a third uplink transmitter;
   a plurality of downlink receivers that comprises at least a first downlink receiver, a second downlink receiver, and a third downlink receiver;
   a plurality of downlink transmitters that comprises at least a first downlink transmitter, a second downlink transmitter, and a third downlink transmitter;
   wherein a first link is carried on a first frequency carrier from said first uplink transmitter to said first uplink receiver, wherein a second link is carried on a second frequency carrier from said first downlink transmitter to said first downlink receiver, wherein a fourth link is carried on said first frequency carrier from said second downlink transmitter to said second downlink receiver;
   wherein a third link is carried on said second frequency carrier from said second uplink transmitter to said second uplink receiver, wherein a fifth link is carried on said first frequency carrier from said third uplink transmitter to said third uplink receiver, wherein a sixth link is carried on said second frequency carrier from said third downlink transmitter to said third downlink receiver; and
   a first relay base station and a second relay base station, wherein said first relay base station and said second relay base station are configured to interchange a frequency of operation between said first frequency carrier and said second frequency carrier simultaneously for uplink transmission and downlink transmission, wherein said multi-hop relay cellular system performs said transmission and reception of said relay base stations simultaneously using said first frequency and said second frequency respectively for said optimal Radio Frequency (RF) circuit design of the multi-hop relay cellular system.

6. The multi-hop relay cellular system as claimed in claim 5, wherein said first relay base station performs a reception of said second link and a reception of said third link on said second frequency carrier, and performs a transmission of said first link and a transmission of said fourth link on said first frequency carrier.

7. The multi-hop relay cellular system as claimed in claim 5, wherein said second relay base station performs said transmission of said first link and said transmission of said fourth link on said second frequency carrier, and performs said reception of said second link and said reception of a third link on said first frequency carrier.

8. The multi-hop relay cellular system as claimed in claim 5, wherein allocating said first frequency carrier and said second frequency carrier is selected from at least one of (i) no overlap implementation of said first frequency carrier and said second frequency carrier, or (ii) partial overlap implementation of said first frequency carrier and said second frequency carrier, or (iii) complete overlap of said first frequency carrier and said second frequency carrier.

9. A method for relaying in a single-hop or a multi-hop relay cellular system by interchanging frequency of operation between backhaul link and access link for an optimal Radio Frequency (RF) circuit design, the method comprising:

performing a reception operation in an uplink on a first frequency carrier from a first relay base station to an access base station through a first link, while simultaneously performing, a transmission operation in a downlink on a second frequency carrier from an access base station to said first relay base station through a second link; and performing a reception operation in said uplink on said second frequency carrier from a user equipment (UE) or a second relay base station to a first relay base station through a third link, while simultaneously performing a transmission operation in a said downlink on said first frequency carrier from a first relay base station to a user equipment (UE) or a second relay base station through a fourth link, wherein said transmission and said reception in said single-hop or said multi-hop relay cellular system performed simultaneously by said relaying using said first frequency and said second frequency respectively for said optimal Radio Frequency (RF) circuit design of the multi-hop relay cellular system.

* * * * *